United States Patent
Reuber et al.

(10) Patent No.: US 8,895,201 B2
(45) Date of Patent: Nov. 25, 2014

(54) HIGH-TEMPERATURE FUEL CELL SYSTEM HAVING A START BURNER

(75) Inventors: Sebastian Reuber, Dresden (DE); Christian Schlemminger, Niederschöna / OT Oberschaar (DE); Mareike Wolter, Dresden (DE); Thomas Pfeifer, Dresden (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 13/389,196

(22) PCT Filed: Jul. 9, 2010

(86) PCT No.: PCT/EP2010/004186
§ 371 (c)(1),
(2), (4) Date: Apr. 23, 2012

(87) PCT Pub. No.: WO2011/015269
PCT Pub. Date: Feb. 10, 2011

(65) Prior Publication Data
US 2012/0208101 A1    Aug. 16, 2012

(30) Foreign Application Priority Data
Aug. 6, 2009    (DE) .......................... 10 2009 037 145

(51) Int. Cl.
*H01M 8/04*    (2006.01)
*H01M 8/12*    (2006.01)
*H01M 8/06*    (2006.01)

(52) U.S. Cl.
CPC ...... *H01M 8/04022* (2013.01); *H01M 8/04268* (2013.01); *H01M 2008/1293* (2013.01); *H01M 8/04007* (2013.01); *Y02E 60/50* (2013.01); *Y02E 60/525* (2013.01); *H01M 8/0612* (2013.01)

USPC .......................................... 429/429; 429/423

(58) Field of Classification Search
USPC .................... 429/429, 423, 408, 452
See application file for complete search history.

(56) References Cited

U.S. PATENT DOCUMENTS

2002/0004154 A1    1/2002    Pastula et al.
2010/0239924 A1*  9/2010    McElroy et al. .............. 429/423

FOREIGN PATENT DOCUMENTS

DE           100 10 006 A1    11/2000
(Continued)

OTHER PUBLICATIONS

"International Application No. PCT/EP2010/004186, International Search Report and Written Opinion mailed Oct. 27, 2010", 11 pgs.
(Continued)

*Primary Examiner* — Mark F Huff
*Assistant Examiner* — Monique Wills
(74) *Attorney, Agent, or Firm* — Schwegman Lundberg & Woessner, P.A.

(57) ABSTRACT

The invention relates to a high-temperature fuel cell system having a start burner. Such fuel cell systems are in particular operated at temperatures between 650° C. and 1000° C. due to the ion-conductive properties of the electrolytes used. It is necessary for this reason to carry out a heating before the actual operation of the systems, which takes place by an external supply of energy. The exhaust gas of a start burner of the high-temperature fuel cell system is supplied to a heat exchanger or to two heat exchangers in a series connection for the preheating of an oxidizing agent which can be supplied to at least one fuel cell at the cathode side. In this respect, the oxidizing agent and the exhaust gas of the start burner are conducted over the total surfaces of the one heat exchanger or of the two heat exchangers available for the heat exchange and hot, returned exhaust gas from the total system is conducted over one heat exchanger of the two heat exchangers arranged in series or in a second zone B of a single heat exchanger having two zones A and B over a part region of the surface available for the heat exchange.

11 Claims, 4 Drawing Sheets

(56) References Cited

FOREIGN PATENT DOCUMENTS

Figure 1:
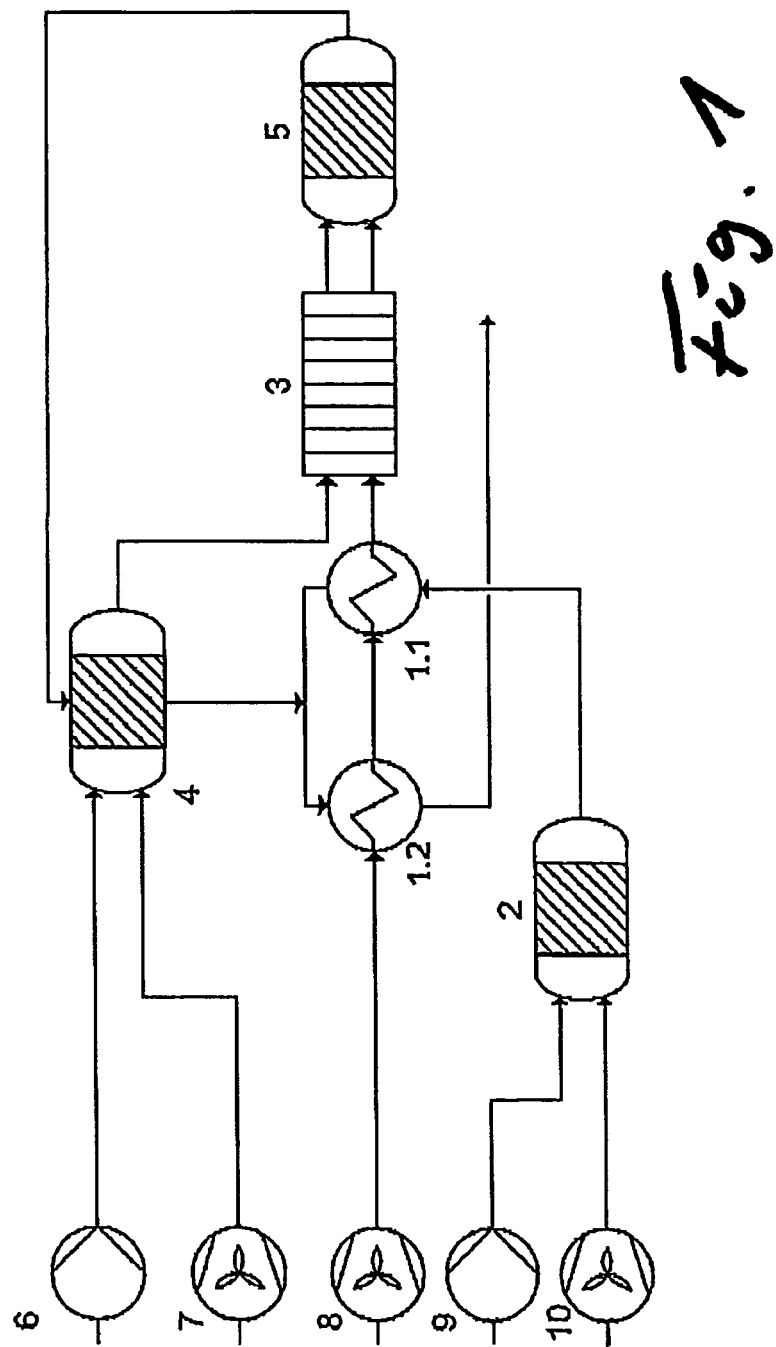

| | | |
|---|---|---|
| DE | 102 31 126 A1 | 2/2004 |
| DE | 10 2007 033 864 | 2/2008 |
| DE | 10 2007 039 594 A1 | 4/2008 |
| EP | 1 557 897 A1 | 7/2005 |

OTHER PUBLICATIONS

"German Application Serial No. 10 2009 037 145.1, Office Action dated Jan. 29, 2013", 5 pgs.

\* cited by examiner

HIGH-TEMPERATURE FUEL CELL SYSTEM HAVING A START BURNER

PRIORITY CLAIM TO RELATED APPLICATIONS

This application is a national stage application under 35 U.S.C. §317 of PCT/EP2010/004186, filed Jul. 9, 2010, and published as WO 2011/015269 A1 on Feb. 10, 2011, which claims priority to German Application No. 10 2009 037 145.1, filed Aug. 6, 2009,which applications and publication are incorporated by reference as if reproduced herein and made a part hereof in their entirety, and the benefit of priority fo each of which is claimed herein.

The invention relates to a high-temperature fuel cell system having a start burner. Such fuel cell systems are in particular operated at temperatures between 650° C. and 1000° C. due to the ion-conductive properties of the electrolytes used. It is necessary for this reason to carry out a heating before the actual operation of the systems, which takes place by an external supply of energy.

In addition to an electrical heating, technical solutions are also known in which additional burners are used. A fuel is combusted in them and the exhaust gases of these burners can then be utilized for the heating of the fuel cells up to the reaching of a sufficient operating temperature.

It is clear that the heating time required for this purpose should be kept as short as possible. In this respect, however, the properties of the fuel cells used must be taken into account. They are, on the one hand, sensitive to thermomechanical strains so that higher temperature gradients should be avoided. In addition, the electrodes present for the electrochemical reaction and also electrically conductive elements are sensitive to chemical reactions and to corrosion so that this must also be taken into account in the heating phase. In addition to a formation of soot, water condensation should also be avoided.

In particular due to the high temperatures, the gas management should be made as simple as possible and valves should be dispensed with where possible in hot regions of the system.

To increase the total efficiency, waste heat of the fuel cells and also from afterburners frequently connected downstream thereof is used to carry out a heating of the oxidizing agent used which is supplied at the cathode side and of a fuel gas which is supplied at the anode side. The waste heat can also be used for the reforming of a fuel in which starting materials in the form of hydrocarbon compounds are converted into a reformate containing hydrogen.

An air pre-heater for solid oxide fuel cell systems is thus known from DE 10 2007 033 864 A1. A start burner is used in this respect for the heating to the operating temperature. It is proposed therein to utilize the exhaust gases of the start burner for the preheating. The exhaust gases of the start burner should be supplied to a heat exchanger in which the oxidizing agent, which is air as a rule, should be heated. In addition to the exhaust gas of the start burner, the two exhaust gas flows of the fuel cells should also be supplied to a heat exchanger.

A temperature control of the air supplied to the cathodes of fuel cells should be able to be achieved by mixing the air heated in the heat exchanger with cold fresh air.

The heat exchanger can therefore, however, not be ideally configured for the two operating modes so that it either has deficits in the heating phase of the fuel cells with a running start burner or in permanent operation when only the exhaust gases of the fuel cells are conducted over it for the preheating.

Since a relatively large time is required for the heating, this known technical solution is used in stationary applications.

It is therefore the object of the invention to provide a high-temperature fuel cell system, wherein a brief heating time to operating temperature is possible without impairing elements of the system and a simple design and economical operation are possible.

In accordance with the invention, this object is achieved by a system having the features of claim 1. Advantageous embodiments and further developments of the invention can be achieved on use of technical features included in dependent claims.

In a high-temperature fuel cell system in accordance with the invention having a start burner, its exhaust gas can be supplied to a heat exchanger or to two heat exchangers which are arranged in a series arrangement. In the one heat exchanger or in both heat exchangers, the oxidizing agent to be supplied to at least one fuel cell at the cathode side is preheated.

In this respect, the oxidizing agent and the exhaust gas are conducted over the total surfaces of the one heat exchanger or of both heat exchangers available for the exchange of heat. The hot, returned exhaust gas of the fuel cell(s) from the total system is conducted, in contrast thereto, only over one of the two heat exchangers arranged in series or, in a second zone B of a single heat exchanger having two zones A and B, over a part region of the surface available for the heat exchange.

The second zone B or the heat exchanger through which hot, returned exhaust gas of the system flows can therefore be dimensioned for the permanent operation of the fuel cell(s). The surface of the heat exchanger(s) usable in the heating phase of the fuel cell(s) is considerably larger, whereby the respectively different required heat flows for heating and for permanent operation can be taken into account.

There is the possibility in the invention of using two heat exchangers of the same design or a single, monolithic heat exchanger.

If the exhaust gas of the start burner and returned, hot exhaust gas of the system is introduced into a single heat exchanger, the lead for hot, returned exhaust gas can be arranged at a heat exchanger subsequent to a first zone A and to the start of the second zone B in the flow direction of the exhaust gas of the start burner through this heat exchanger. A heat exchanger produced as standard can also have at least two connections for the introduction of the hot, returned exhaust gas of the system which are arranged after one another in the flow direction of the oxidizing agent for an adaptation to different operating conditions in permanent operation of a system. By closing such connections and by using only one of the connections, an adaptation can be achieved by a changed size of the zones A and B and of the surface of the heat exchanger which is flowed over by the hot, returned exhaust gas of the system.

In the invention, the surface of the second zone B of the one heat exchanger or of the second heat exchanger of the two heat exchangers arranged in series, which is available for the heat exchange, through which the hot, returned exhaust gas of the system is conducted, is at a maximum as large as the surface of the first zone A of the heat exchanger or of the first heat exchanger through which exhaust gas of the start burner and the total oxidizing agent flow.

A system in accordance with the invention can be made so that a reformer is also present to which heat of the hot exhaust gas returned from the system can additionally be transferred for the reforming. In this respect, the hot, returned exhaust gas of the system can subsequently be supplied to the one heat exchanger and can be utilized for the preheating of the oxidizing agent in the permanent operation of the system. The efficiency in the reforming can thereby be increased.

In a manner known per se, an afterburner with which non-oxidized or not fully oxidized components of the exhaust gas of the fuel cell(s) at the anode side can be post-oxidized also be connected downstream of the fuel cell(s). The exhaust gas removed from the afterburner as a rule has a temperature further increased with respect to the exhaust gas being discharged directly from fuel cells.

During the heating phase, in the invention, only heated oxidizing agent, that is, hot air as a rule, moves into the fuel cells at the cathode side, whereby no chemical impairment of the electrodes can be caused. The heating rate can additionally be influenced by control or regulation of the start burner. In this respect, a compressor can be controlled, for example, to change the thermal power of the start burner, if this is necessary. In this respect, at least one temperature sensor can be used for the regulation. It can detect the temperature in fuel cells. In this respect, on too fast a temperature increase and for the avoidance of thermomechanical strains, the thermal power can be reduced. An exceeding of a specific maximum permitted heating rate for the respective system can thus easily be avoided.

On reaching a temperature of the fuel cells sufficient for the operation at which the electrochemical reaction can take place, the start burner can simply be switched off. From this point in time onward, only hot, returned exhaust gas of the system is conducted over the heat exchanger and utilized for the preheating of the oxidizing agent.

Since a compressor associated with the start burner and also a further compressor for the supply of the oxidizing agent which is supplied to the fuel cells at the cathode side are present for the supply of an oxidizing agent to the start burner, the compressor associated with the start burner can also be temporarily utilized during the operation with switched-off start burner. This is particularly advantageous when the exhaust gas of the fuel cells is conducted through the one heat exchanger or through the one zone B of a single heat exchanger and in this respect temperatures of the preheated oxidizing agent would occur which are too high.

The compressor associated with the start burner can then supply a cold oxidizing agent, preferably air, to the heat exchanger(s) and a cooling effect can thereby be achieved which can give the oxidizing agent supplied to the fuel cells an ideal temperature. In this respect, a bypass line around the start burner can preferably be led to the heat exchanger(s), said line having a valve at the cold side. With a correspondingly open valve, the cold air from the compressor can move directly to the heat exchanger(s) and flow losses by the start burner can thereby be avoided.

A system in accordance with the invention can be made in a simple and compact manner. The one heat exchanger or the two heat exchangers can be flanged simply to a single fuel cell or to a stack of a plurality of fuel cells. Elements such as valves or bypass lines which act as actuators can be dispensed with completely or at least in hot, critical regions, whereby the costs are reduced.

The invention can be used particularly advantageously in small systems in which a frequent start-up, also in mobile use, is required.

The invention will be further explained in the following with reference to advantageous examples.

Figure 2:
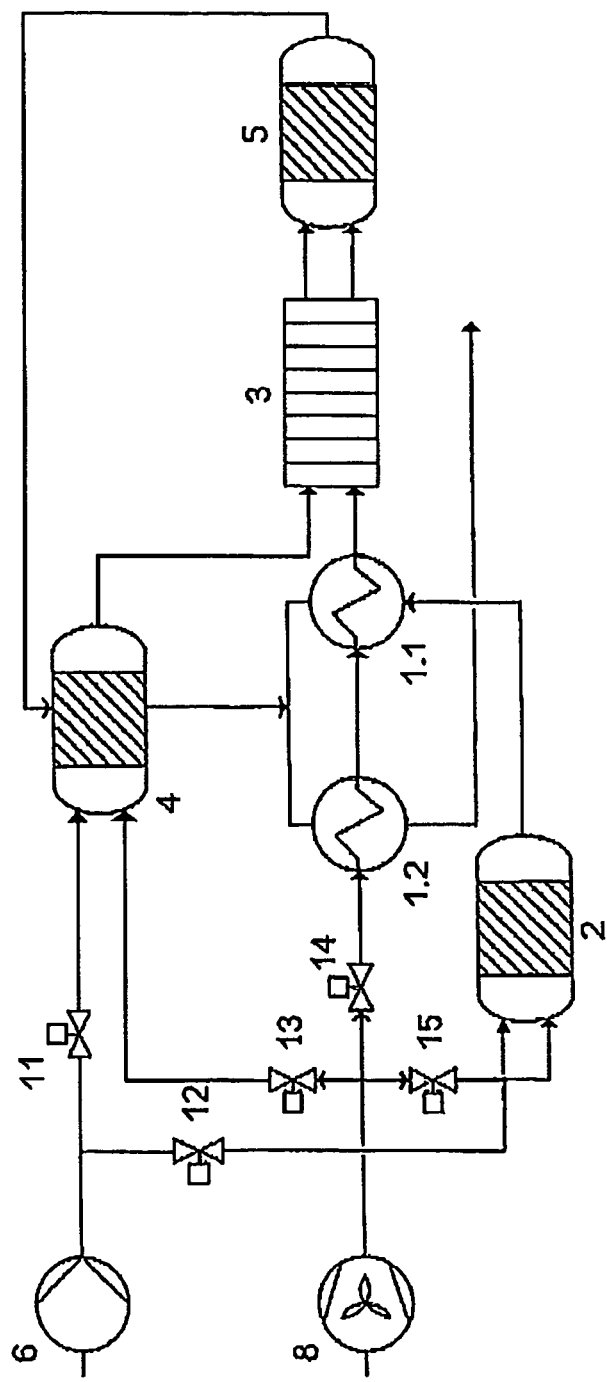
Figure 3:
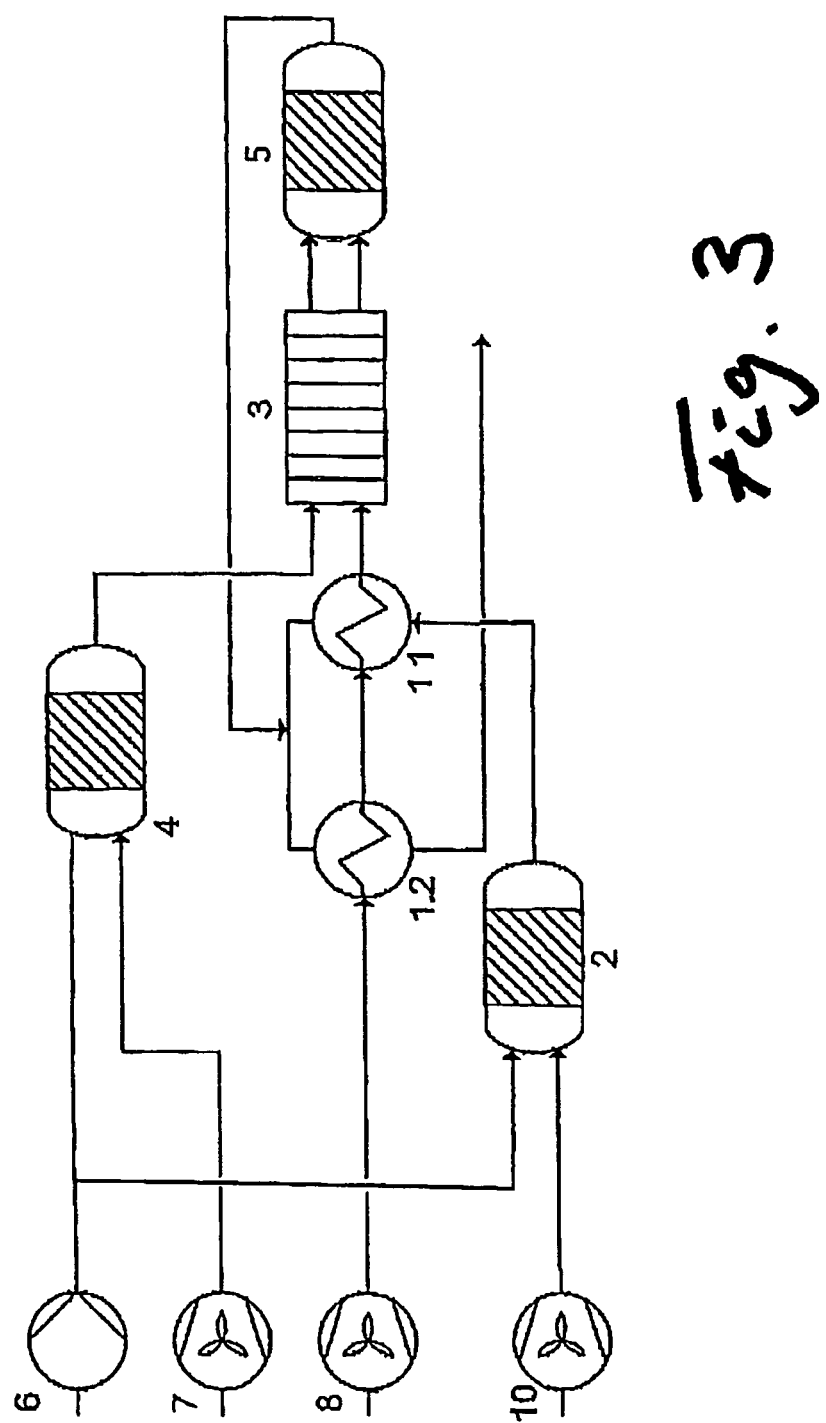
Figure 4:
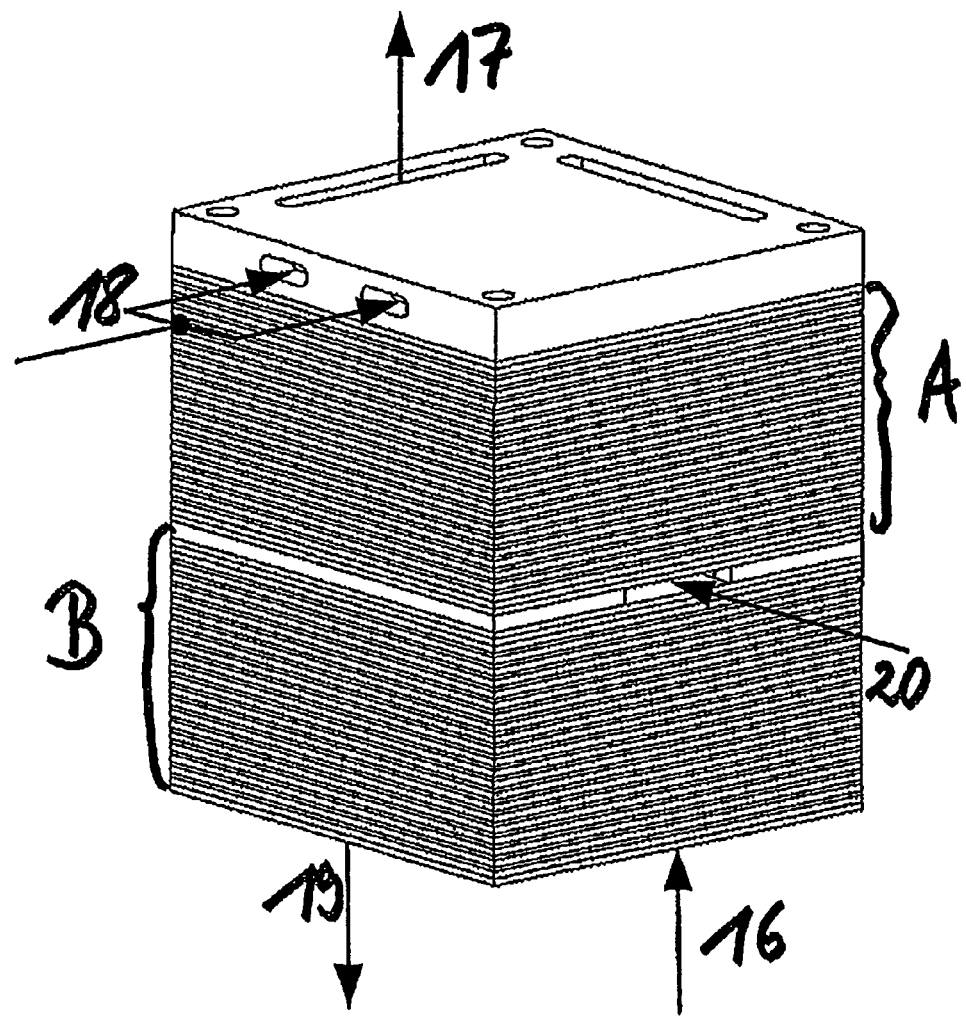

There are shown:

FIG. 1 a block diagram of an example of a system in accordance with the invention;

FIG. 2 a block diagram of a second example of a system in accordance with the invention;

FIG. 3 a block diagram of a further example of a system in accordance with the invention; and FIG. 4 a heat exchanger having two zones A and B.

In the example shown in FIG. 1, stacked fuel cells 3 are present which are supplied from a reformer 4 with fuel gas containing hydrogen at the anode side and with air as the oxidizing agent at the cathode side. In this respect, fuel gas and air can be supplied to the reformer via two compressors 6 and 7.

Air is conducted by the compressor 8 to the two heat exchangers 1.1 and 1.2 arranged in series. The air preheated in this manner to a desired temperature level can then reach the cathodes of the fuel cells 3.

The exhaust gas of the anodes and of the cathodes is supplied to the afterburner 5 in which a post-oxidation can take place when the system is operated in permanent operation and the electrochemical reaction takes place in the fuel cells 3.

The hot, returned exhaust gas of the system can be returned to the reformer 4 again and said reformer can be heated by heat exchange, whereby the reforming process can be assisted.

The hot, returned exhaust gas of the system is supplied from the reformer 4 to the heat exchanger 1.2 to heat the air for the operation of the fuel cells 3 with the residual heat of said exhaust gas. In this connection, the air is conducted through both heat exchangers 1.1 and 1.2 and the hot, returned exhaust gas of the system is only conducted through the heat exchanger 1.2.

When the system is started up, it is heated to a sufficiently high temperature at which the electrochemical reaction is possible in the fuel cells. In this respect, no fuel, and optionally also no air, are supplied to the reformer 4. Air is only conducted to the heat exchangers 1.1 and 1.2 by the compressor 8. At the same time, the start burner 2 is supplied with fuel and air via the compressors 9 and 10.

The exhaust gas of the start burner 2 is supplied to the heat exchanger 1.1 and first flows in the opposite direction to the air through the heat exchanger 1.1 and then through the heat exchanger 1.2. The air is in this respect preheated and can thus be utilized for the heating of the fuel cells 3 and can be supplied to them.

Once the required temperature is reached, the fuel supply to the start burner 2 can be blocked and the normal permanent operation of the system can be started by putting the reformer 4 into operation, as was initially described.

The example shown in FIG. 2 corresponds in substantial points to the example in accordance with FIG. 1 and the same individual elements are also present, such as the fuel cell stack 3, the afterburner 5, the reformer 4, the start burner 2 and the two heat exchangers 1.1 and 1.2. Only the gas flows are influenced by valves 11 to 15 present in the supply lines, and thus the operation of the system is influenced.

The valve 11 is thus closed on the start-up of the system, while the valve 12 is open. No fuel thereby reaches the reformer 4. However, the start burner 2 can be supplied through the open valve 12. In this operating mode, the valves 14 and 15 are also open via which the air conveyed from the compressor 8 can flow to the start burner 2 and to the heat exchangers 1.1 and 1.2. At the same time, the hot exhaust gas flows out of the start burner 2 to the heat exchanger 1.1 and from this to the heat exchanger 1.2. It is conducted therein in counterflow to the air. The air is heated in this process and enters at the cathode side into the fuel cells 3 for its heating.

Once the temperature required for the electrochemical reaction has been reached, the valves 12 and 15 are closed and the valves 11 and 13 are opened. The reformer 4 is supplied with fuel and air so that it can conduct reformed fuel gas to the anodes of the fuel cells 3.

The exhaust gas of the fuel cells 3 moves into the afterburner 5 and from there the hot, returned exhaust gas of the system can again be supplied via the reformer 4 to the heat exchanger 1.2 in which the preheating of the cathode air can take place in permanent operation of the system.

In this example, the valve 14 is a regulating valve for the air volume flow. With a regulable compressor 8, this valve 14 could be dispensed with.

All the valves 11 to 15 are arranged here in regions in which no hot air flows and are therefore relatively inexpensive.

In the example shown in FIG. 3, the hot, returned exhaust gas of the system is not conducted via the reformer 4 for its heating, but rather directly from the afterburner 5 to the heat exchanger 1.2 in permanent operation.

The start burner 2 is again supplied with fuel and air in the heating phase. Its exhaust gas moves into the heat exchanger 1.1 and from this into the heat exchanger 1.2 in which the air conveyed by the compressor 8 is heated and is supplied to the cathodes of the fuel cells 3. In the heating phase, the reformer 4 is not operated and in this respect no reformed fuel gas can be supplied to the anodes of the fuel cells 3. The start burner 2 is only switched off when the required temperature has been reached and the reformer 4 is taken into operation in order then to start the normal permanent operation of the system.

In FIG. 4, a heat exchanger 1 is shown which has two zones A and B. Air moves via an inlet 16, which is arranged at the bottom here, into the heat exchanger 1 and is conducted in the individual planes of the heat exchanger 1 formed as a plate heat exchanger here and through said heat exchanger from the bottom to the top to the air outlet 17. The air first flows in so doing through the zone B and then through the zone A.

During the heating of the system, hot exhaust gas is introduced from the start burner 2 into a feed 18, arranged at the top at the heat exchanger 1 here, into said heat exchanger and flows opposite to the air through the zones A and B, in each case on the other side of the plates of the heat exchanger 1, along which side the air flows. The hot exhaust gas of the afterburner 2 can exit the heat exchanger 1 again via the outlet 19 arranged at the bottom here.

Once a sufficient heating has been reached in the system and the start burner 2 has been able to be switched off, returned, hot exhaust gas of the system is introduced via the inlet 20 into the heat exchanger 1 after exiting an afterburner 5. The inlet in this example is arranged at the start of the zone B and at the end of the zone A. The hot, returned exhaust gas of the system thereby only flows through the zone B in cross-flow and at the other side of the plates past which the air flows. The surface flowed over in this process is smaller than the surface previously flowed over by the exhaust gas of the start burner 2.

The heat exchanger 1 in this example has a square cross-section. Other cross-sectional geometries are, however, also possible. The dimensioning can take account of the respectively required heat flows Q on heating and during the normal permanent operation. This equally applies to the arrangement of the inlet 20 for the hot exhaust gas of the start burner 2 with which the size of the zone B and the available surface for the heat exchange of the hot, returned exhaust gas of the system can be influenced.

The invention claimed is:

1. A high-temperature fuel cell system comprising:
   a system output providing a system exhaust gas;
   a start burner providing a start burner exhaust gas, and
   a heat exchanger, having two zones A and B, the heat exchanger configured to (1) during a start-up operation, selectably route the start burner exhaust gas, but not the system exhaust gas, through both zones A and B to preheat an oxidizing agent for supply to at least one fuel cell at the cathode side and to (2) after the start-up operation and during a subsequent operation, selectably route the system exhaust gas, but not the start burner exhaust gas, through just the second zone B and not through the first zone A.

2. The system in accordance with claim 1, wherein the second zone B, which is flowed through by the system exhaust gas is dimensioned for the permanent operation of the fuel cell(s).

3. The system in accordance with claim 1, wherein a feed for the system exhaust gas is arranged at a position of the heat exchanger subsequent to a first zone A and at the start of the second zone B in the direction of flow of the start burner exhaust gas through the heat exchanger.

4. The system in accordance with claim 1, wherein system exhaust gas is conducted over a heat exchanger present at a reformer to the second zone B of the heat exchanger during the subsequent operation of the system.

5. The system in accordance with claim 1, wherein the system exhaust gas of the fuel cell(s) is conducted into an afterburner.

6. The system in accordance with claim 1, wherein at least two connections are arranged sequentially at the heat exchanger for the introduction of the system exhaust gas in the direction of flow of the oxidizing agent.

7. The system in accordance with claim 1, wherein the heat exchanger is a single heat exchanger having the first zone A and the second zone B, the two zones A and B being arranged in a serial arrangement.

8. The system in accordance with claim 1, wherein the heat exchanger includes two heat exchangers, a first heat exchanger of the two heat exchangers having the first zone A and a second heat exchanger of the two heat exchangers having the second zone B, the two heat exchangers being arranged in a serial arrangement.

9. The system in accordance with claim 7, wherein the system exhaust gas is conducted via only the second zone B of the heat exchanger having two zones A and B.

10. The system in accordance with claim 8, wherein the system exhaust gas is conducted via only one heat exchanger of the two heat exchangers arranged in the serial arrangement.

11. The system in accordance with claim 1, wherein, during the subsequent operation, the start burner is shut-down and does not produce the start burner exhaust gas.

* * * * *